United States Patent [19]

Wolter et al.

[11] Patent Number: 4,747,879

[45] Date of Patent: May 31, 1988

[54] METHOD AND APPARATUS FOR THE THERMAL TREATMENT OF MEAL-LIKE RAW MATERIALS

[75] Inventors: Albrecht Wolter, Cologne; Horst Herchenbach, St. Johann, both of Fed. Rep. of Germany

[73] Assignee: Klöckner-Humboldt-Deutz Aktiengesellschaft, Fed. Rep. of Germany

[21] Appl. No.: 925,273

[22] Filed: Oct. 31, 1986

[30] Foreign Application Priority Data

Oct. 31, 1985 [DE] Fed. Rep. of Germany ....... 3538707

[51] Int. Cl.⁴ .............................................. C04B 7/43
[52] U.S. Cl. ..................................... 106/100; 432/14; 432/106
[58] Field of Search .................... 106/100; 432/14, 106

[56] References Cited

U.S. PATENT DOCUMENTS

| | | | |
|---|---|---|---|
| 4,299,564 | 11/1981 | Herchenbach et al. | 432/106 |
| 4,315,734 | 2/1982 | Ramesohl et al. | 432/106 |
| 4,370,127 | 1/1983 | Abelitis | 432/106 |
| 4,504,319 | 3/1985 | Wolter et al. | 106/100 |
| 4,568,276 | 2/1986 | Fujisawa | 106/100 |

FOREIGN PATENT DOCUMENTS 3333705 4/1985 Fed. Rep. of Germany ...... 106/100

Primary Examiner—Steven Capella
Attorney, Agent, or Firm—Hill, Van Santen, Steadman & Simpson

[57] ABSTRACT

A method and apparatus for the thermal treatment of pulverulent raw material in the manufacture of cement clinker including passing raw material first through a multi-stage preheating treatment including cyclones arranged following one another, next passing the material through a reaction stack for calcination, then passing the material through a sintering kiln and thereafter through a clinker cooler, the exhaust air from the clinker cooler and the exhaust gas from the sintering kiln being passed parallel to the each other with the material discharged into conduits respectively carrying the discharged clinker cooler air and the sintering gases with burners in the conduits and the gases thereafter passing up through the reaction stack and then through a separator and into the sintering kiln.

20 Claims, 4 Drawing Sheets

METHOD AND APPARATUS FOR THE THERMAL TREATMENT OF MEAL-LIKE RAW MATERIALS

BACKGROUND OF THE INVENTION

The invention relates to improvements in apparatus and method for the thermal treatment of pulverized raw materials, preferably in the manufacture of cement clinker from raw material wherein the material is thermally treated in a burning process by preheating, calcining, sintering and cooling. More particularly, the invention relates to an improvement wherein the exhaust gas stream of the sintering stage and the exhaust airstream of the cooling stage from the clinker cooler are utilized in a unique arrangement for calcination and preheating.

Alkalis which are involved in the processing of cement, such as the salts KCl, $K_2SO_4$ or $Na_2SO_4$ frequently have an undesirable influence on the quality of the cement and their inhibition effect has an impeding result on the process of calcination due to impeding the burn-out of the fuels introduced in the calcination stage.

An example of this is shown in burn-out curves illustrated in FIG. 4 of the drawings which have been developed experimentally utilizing a coal dust burner. For the development of the curves of FIG. 4, coal dust was blown into a heated tube. The solid curves show the burn-out in the CO content in normal atmosphere. The broken line curves show the burn-out in CO content, and the CO content in an atmosphere charged with alkali vapors. The ignition delay as well as the deterioration of the residual burn-out can be seen from these curves.

What is referred to as "alkali circulation" is known in the manufacture of cement clinker. The alkalis vaporized in the sintering stage due to the high temperatures involved are withdrawn from the kiln together with the exhaust gas stream and agglomerate and delivered to the cooler raw meal due to condensation. This raw meal already contains alkalis which migrate into the kiln in the countercurrent flow relative to the exhaust gas stream. Thus, the alkalis are increasingly enriched in the exhaust gas stream of the kiln over the course of time because the alkalis newly introduced together with the raw meal partially vaporize and add to the alkalis already present in the gas circulation. As a consequence, higher temperatures are required in the calcination stage for the same calcining work and a more difficult burn-out of the fuels introduced into the calciner results. With the same calcining work, this causes an increased fuel consumption and a higher exhaust gas temperature.

Systems using calciners wherein pure air is utilized as reaction gas do not encounter the aforementioned problems. The alkalis thus exercise a considerable inhibiting effect on the combustion process. On the other hand, a discarding of the kiln exhaust gases in the calcining process effects a significant loss in thermal efficiency and thermal balance.

In traditional systems wherein exhaust air from the cooler and exhaust gas from the tubular kiln are utilized for the calcination of the raw meal, the previous aim was an optimally fast and complete mixing of the two gas streams with one another. This, however, promoted the inhibiting effect of the alkalis. German Pat. No. OS 3 333 705 discloses a method and an installation for the manufacture of cement clinker low in noxious materials and particularly low in alkali. In accordance with this method, the preheated raw meal is divided into two substreams with one substream being calcined in the exhaust gas stream of the rotary tubular kiln and the other substream being calcined in the exhaust airstream of the clinker cooler and the two streams are conducted in common into the separating cyclone of the calcination stage. This method is only advantageous when a variable part (from 0 through 100%) of the kiln exhaust gas is to be conducted past the exhaust airstream of the clinker cooler in a bypass.

Accordingly, an object of the present invention is to prevent the inhibiting effect of the vaporizing alkalis on the burn-out of fuels introduced into the calcination stage to the largest possible degree. Further, an object is to make this possible by only slight structural modifications in systems which already include a reaction stack in which the exhaust gas stream of the kiln and the exhaust gas stream of the clinker cooler are intimately mixed with one another. This objective makes it possible to remodel old systems and convert them to attain the structure and method of the present invention in a way which does not involve a substantial cost. Further, the $NO_x$ constituent in the kiln exhaust gas will be appreciably lowered.

A feature of the invention is to achieve the foregoing objective in a unique manner by having both gas streams exist side-by-side in the same reaction stack leading from the calciner. Thus, the advantages of otherwise separate exhaust air and exhaust gas control in separate conduits can be utilized with a reduced alkali concentration and a lower inhibiting effect on fuel consumption. This is accomplished without substantial investment in additional apparatus utilizing systems in which calcination occurs either exclusively or predominantly in the exhaust airstream of the clinker cooler and the exhaust gas stream of the kiln is utilized only for the preheating of raw material. Features of the method also obtain a prerequisite for optimally balanced flow conditions. In accordance with the development of the method, parallel guidance of two gas streams in a common reaction stack occurs up to the cyclone separator of the calcination stage. For this purpose, passages of the reaction stack lie in the plane of the gas flow. The invention utilizes parallel guidance of the gas streams into the cyclone separator and this is advantageous in that the inhibiting effect of the alkalis particularly occurs in the burn-out of the fuel and for this reason a long path in the reaction stack from the calciner is required for burn-out. In accordance with a feature of the invention, a parallel guidance of the two gas streams emitted from the calciner and from the cooler occurs only up to the first elbow of the reaction stack when the inhibiting effect of the alkalis occurs mainly at the beginning of the combustion of the fuel. In an embodiment, a fixing of the two gas streams occurs when the reaction stack leads in a direction departing from the plane in which the original flow direction of the two gas streams proceeds upon entry into the reaction stack.

For the control of the calcination temperature, fuel is introduced into the exhaust airstream and/or exhaust gas stream before they are mixed with one another. The fuel can be either in a solid, liquid or gaseous form. The quantity of fuel can be controlled such that the alkali content of the kiln exhaust gases be taken into consideration and the inhibiting effect on the combustion of the fuel is avoided to the largest possible degree. The quantity of $NO_x$ in the exhaust gas can also be advantageously influenced by the quantity and type of fuel employed.

The method is implemented such that a quantity of fuel is introduced into the exhaust gas stream in an amount that the residual oxygen is completely consumed and an excess of fuel is preferably introduced. As a result of this procedure, the $NO_x$ content in the exhaust gas is advantageously significantly lowered as a result of the exhaust gas temperature and of the offering of reduction means.

The method of the invention further provides that the raw material coming from the separating cyclone of the preheating stage is delivered to the exhaust gas stream and/or to the exhaust airstream before they are mixed with one another. The division of the raw material into the two substreams enables a controlling influence on the calcination conditions. The inhibiting effect of the alkalis initially occurs only in the exhaust gas stream of the rotary tubular kiln so that the overall alkali charge of the raw material can be influenced by controlling the quantities delivered into the respective gas streams. As a result thereof, difficult fuels, such as anthracite and oil coke can be be burned in the exhaust airstream of the cooling stage.

In accordance with the method of the invention, the raw material coming from the separating cyclone of the preheating stage is delivered at the boundary surface between the exhaust gas coming from the kiln and the exhaust airstream coming from the cooler before they are mixed with one another. This form of introduction of the raw material is advantageous when a metering shunt and separate feed conduits to the delivery locations of the raw material into the calciner into the reaction stack are not possible. The introduction and the division of the raw material into the two gas streams can occur with auxiliary means such as adjustable strips or baffles in the region of the delivery location.

Other advantages, features and objectives of the invention will become more apparent with the teachings of the principles thereof in connection with the disclosure of the preferred embodiments in the specification, claims, and drawings, in which:

DESCRIPTION OF THE DRAWINGS

FIG. 4 is a graph illustrating the inhibiting effect of alkalis on the combustion of fuel as above referred to.

DESCRIPTION OF THE PREFERRED EMBODIMENTS

Figure 1:
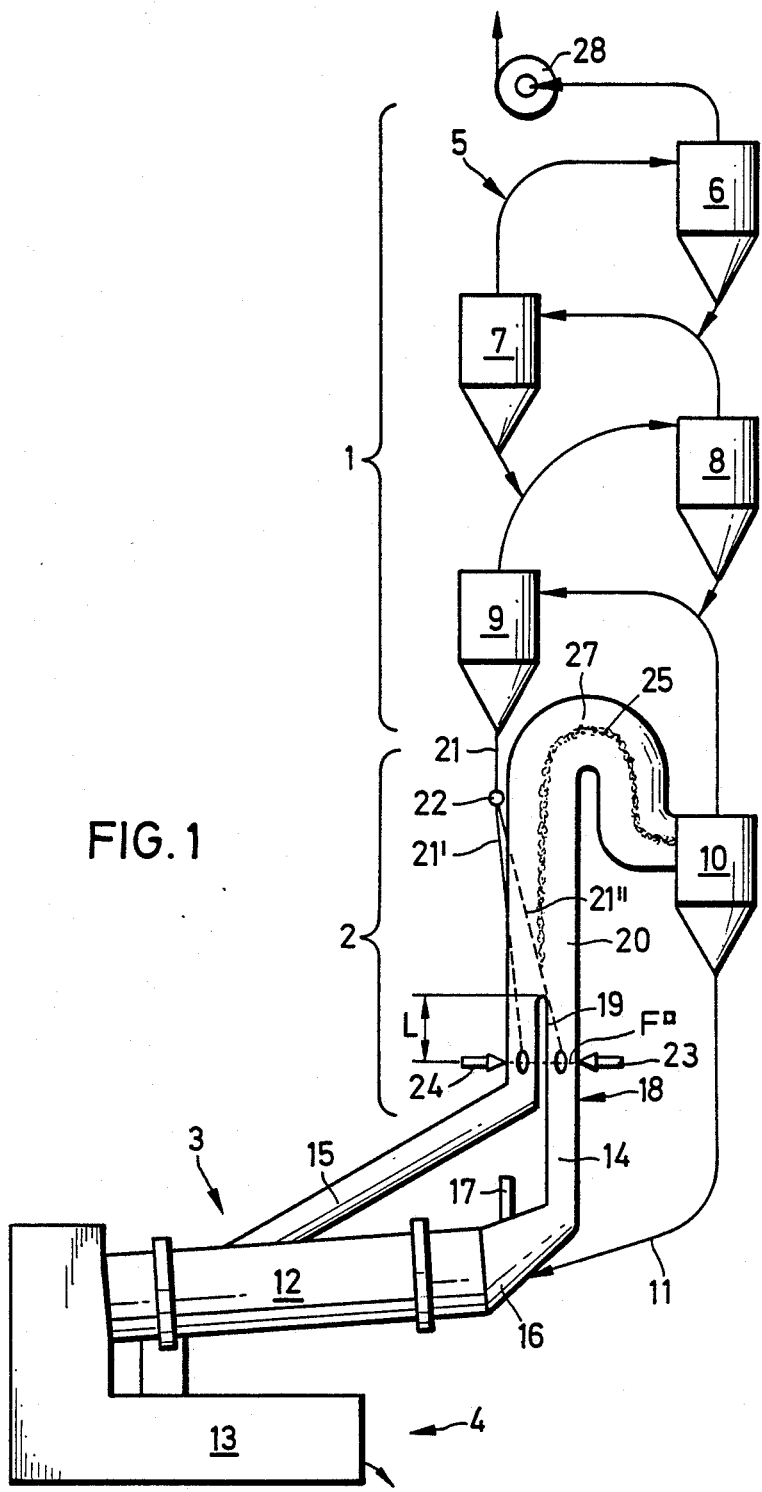
FIG. 1 is a somewhat schematic illustration of a system for the manufacture of cement clinker including a preheating stage, a calcination stage, a sintering stage, and a cooling stage.

FIG. 1 illustrates an overall system for the manufacture of cement clinker. Raw material is delivered into a preheating stage 1 at location 5 and is delivered into the rising main to the highest heat exchanger cyclone 6. In a countercurrent flow to the heating gas, the material successively migrates through the heat exchanger cyclones 7, 8 and 9 of the preheating stage 1 in order to be then separated from the gas stream in a separating cyclone 9. The material then is divided into two feeder conduits 21' and 21" from a feeder conduit 21 which leads from the cyclone 9 to a metering shunt 22 which divides the feed of material into the two feeder conduits. The two feeder conduits 21' and 21" lead into the thermal treatment zone illustrated by a calcination stage 2 provided in a reaction stack 20.

The feeder conduits 21' and 21" open into the reaction stack 20 wherein the thermal treatment occurs and the feeder conduits distribute material in counterflow to an exhaust gas stream from a rotary tubular kiln 12 and an exhaust airstream from a clinker cooler 13. These streams are maintained separated from one another by a partition 19.

The reaction stack 20 which provides the thermal treatment zone is formed by substantially parallel conduits. An exhaust gas conduit 14 leads from the rotary tubular kiln 12. An exhaust air conduit 15 leads from the clinker cooler 13.

The reaction stack 20 is rectangular or quadratic in cross-section and equals in cross-sectional area to the sum of the cross-sections of the two conduits 14 and 15. That is, their cross-sectional areas at the location 18 are essentially equal to the cross-sectional area of the reaction stack 20 at the location where the conduits 14 and 15 discharge into the reaction stack 20. The ratio of the lengths of the vertical portions of the conduits 14 and 15 to the reaction stack 20 is in the range of 1:1 through 1:10, but preferably lies in the range of 1:2 through 1:4. To this end, the exhaust gas conduit 14 and the exhaust air conduit are rectangular or quadratic in cross-section. The exhaust gas conduit 14 begins at the kiln admission 16 of the sintering stage 3. The exhaust air conduit 15 leads from the clinker cooler 13 of the cooling stage 4. This rectangular or quadratic shape is required so that the laminar flow conditions which prevail in the two conduits 14 and 15 are preserved in side-by-side relationship as long as possible after they have been united in the reaction stack 20. This laminar flow condition aids in attaining the desired calcination effects and the inhibiting effect of the vaporized alkalis on the combustion of fuel is prevented to the largest possible degree. In accordance with the method of the invention, it must be assured that the same gas velocity prevails in the two conduits 14 and 15 to avoid the inevitable mixing of one gas stream with the other and the mixing is thus deferred as long as possible. It is contemplated that a regulation of the gas velocity can be accomplished by controls in each or both of the conduits 14 and 15 before they are brought together.

Fuel is introduced in either solid or liquid form, such as coal dust or oil and delivered into the exhaust gas stream from the exhaust gas conduit 14 at the location 23. Fuel is also delivered into the exhaust airstream from the exhaust air conduit 15 at the location 24 preferably where the feeder conduits 21' and 21" for the raw material enter the conduits 15 and 14 respectively.

As the exhaust gas conduit and exhaust air conduits 15 flow upward in parallel relationship to eventually join the reaction stack 20, a partition 19 separates the gas streams in conduits 14 and 15 from another. The partition 19 extends upwardly beyond the introduction of the feeder conduits 21' and 21" into the conduits 15 and 14. The length of the separating partition 19 is selected such that the residual oxygen content in the kiln exhaust gases is sure to be consumed by the fuels which are introduced. The length of the partition is based on the calcination conditions prevailing in the reaction stack 20. The length of the partition shown at L in FIG. 1 is measured from the burner 23 at the side of the exhaust gas stream flowing in 14 up to the upper edge of the partition 19. The partition 19 is based on or is a function of the cross-sectional area F of the reaction stack 20 at the location of the upper end of the partition 19. The length of the partition is calculated on the basis of the following equation:

$$L = \tfrac{1}{2} \cdot F \text{ through } L = 2 \cdot F.$$

The partition 19 prevents a premature mixing of the two gas streams and serves the purpose of stabilizing them, particularly because their flow conditions are first disturbed by the introduction of fuel and the introduction of raw meal. When the flow conditions have been restabilized as a result of partition 19, a boundary layer 25 is initially formed between the flows of exhaust gas rising in the conduit 14 and exhaust air rising in the conduit 15. A gradual mixing of the two gas streams occurs in this boundary layer 25. This mixing is largely avoided even in the curvature of the elbow 27 of the reaction stack 20 when the curvature is designed so as to follow the plane in which the flow lines proceed, and this avoids an otherwise intermediate mixing which might occur. A largely laminar flow condition occurs and results in the fact that a pressure loss in the reaction stack is relatively low. An intermediate complete mixing of the two gas streams with one another would lead to high pressure losses.

The partition 19 is preferably double-walled for the purpose of insulation. For this purpose, the walls of the separator 19 are arranged spaced from one another starting with the location 18 where the exhaust gas conduit 14 and the exhaust air conduit 15 are brought in parallel relationship. The walls can be designed as continued metal jackets which extend from the exhaust gas and exhaust air conduits. A flow of air can be introduced flowing through the space in the divider wall 19 and a lining can be provided in the partition 19 such as would be formed of a hollow refractory stone or brick and this may be designed with passages so that a flow of coolant can be passed therethrough.

In existing systems which include a reaction stack for calcination and in which exhaust gas from the kiln and exhaust air from the clinker cooler are intimately mixed, these existing systems can be fairly readily rebuilt so that the introduction of the exhaust air is modified and so that it enters parallel to the exhaust gas. Such rebuilding would involve the introduction of a partition of appropriate length beginning from the location where the two streams are normally mixed. A complete full separation of the two gas streams in the reaction stack is difficult to accomplish in normal circumstances due to the introduction of the solids of the raw meal. It was heretofore considered that the mixing of two gas streams should occur quickly and completely. In accordance with the present invention even with improper control, "skeins" of the two gas streams will still exist unmixed side-by-side in the reaction stack with the construction and method of the present invention.

The reaction stack 20 discharges into a separating cyclone 10 wherein a mixing of the two gas streams with one another occurs and wherein the calcined raw meal is separated. The raw meal is then conducted through a conduit 11 into the kiln admission 16 of the sintering stage 3 where it is sintered to form clinker. The clinker is cooled in the clinker cooler 13 of the cooling stage 4 with fresh air which is introduced into the calcining stage 2 as hot exhaust air via the exhaust air conduit 15. The exhaust gas from the kiln 12 and the exhaust air flow through the heat exchanger cylones 9, 8, 7 and 6 then flow in common flow and are drawn by an exhaust fan 28 through a filter, not shown.

For regulating the alkali charge of the kiln exhaust gases, the system includes a partial gas withdrawal 17 in the kiln exhaust gas line. With this construction, it is possible to withdraw part of the kiln exhaust gases if a too great a rise of alkali content occurs.

Figure 2:
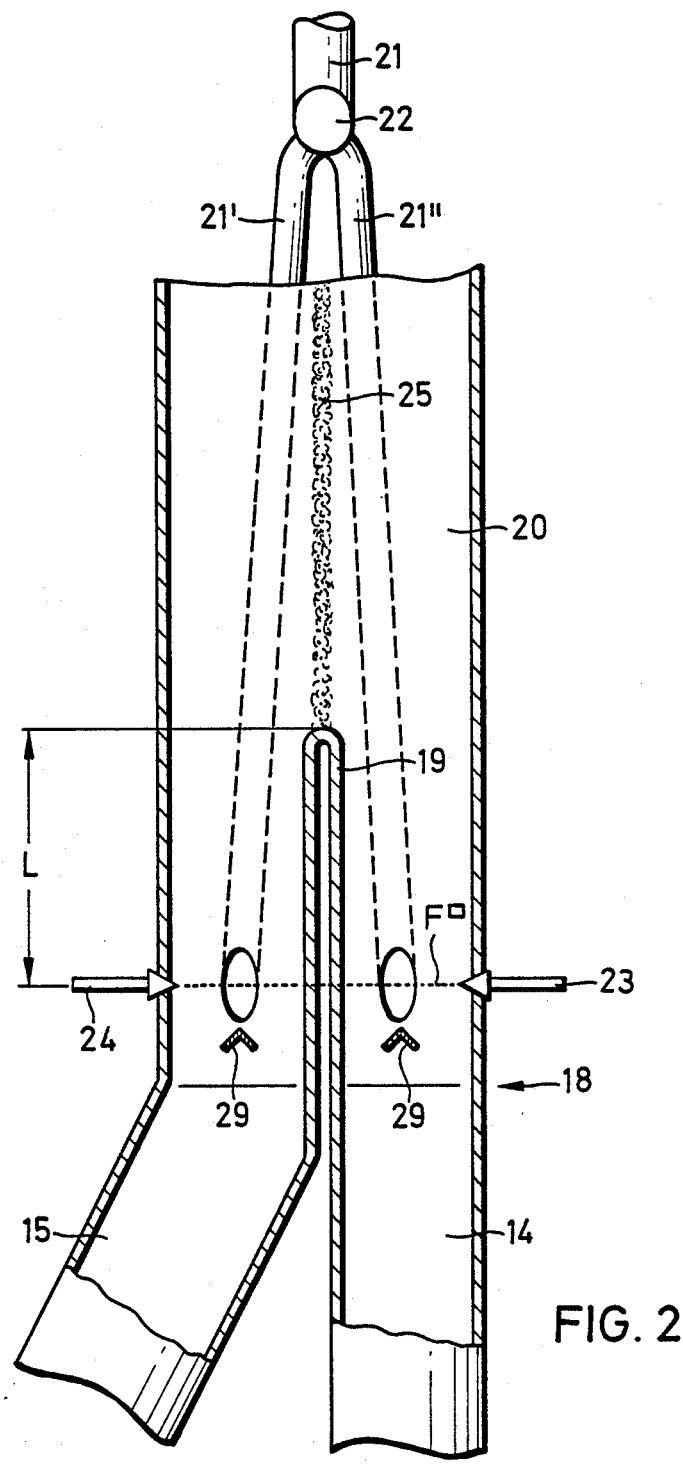
FIG. 2 is an enlarged fragmentary detailed view of the exhaust gas conduit coming from the kiln and the exhaust air conduit coming from the cooler with means for delivering raw material to the thermal treatment area.

FIG. 2 shows schematically in larger detail the lower part of the reaction stack 20 being generally in partial vertical section. Entering from the lower right is the exhaust gas conduit 14 from the kiln. The exhaust air conduit 15 from the cooling stage enters from the left. These flows proceeding in parallel discharge into the reaction stack 20 and flow in parallel from the point 18. The partition 19 proceeds between the two conduits 14 and 15 from the location 18. The partition 19 separates the two gas streams including the location at which burners 23 and/or 24 are located and at the location to which the preheated raw meal is delivered. The raw meal arrives from the lowest heat exchanger cyclone of the preheater stage and flows through the feeder conduit 21, then through the metering shunt 22 and into the feeder conduits 21' and 21". The metering shunt 22 allows a controlled division of the raw material into the two gas streams. The partition 19 insures that stable flow conditions again occur in the two gas streams which are separated from one another by a boundary layer 25 after the admission of the raw meal and after the gas streams have passed the burners.

In a modification of the structure which is illustrated, either the fuel or the raw material can be delivered into only one of the gas streams. Also, it is contemplated that two admission locations for the raw meal may be provided in each of the gas streams with these locations positioned opposite each other. The partition 19 is double-walled. By virtue of the partition, the two pipelines of the exhaust gas conduit 14 and the exhaust air conduit 15 extend beyond the introduction location 18 parallel to each other and at a spaced distance from each other until they unite after traveling the path L measured from the location of the burner 23. The length of the partition 19 is calculated based on an equation as a function of the cross-sectional area F of the reaction stack 20 at this location. Cooling air can be circulated into the cavity formed by the partition 19. The delivery of the raw meal can be controlled to be made more uniform into the gas stream with the use of distributing auxiliaries 29.

Figure 3:
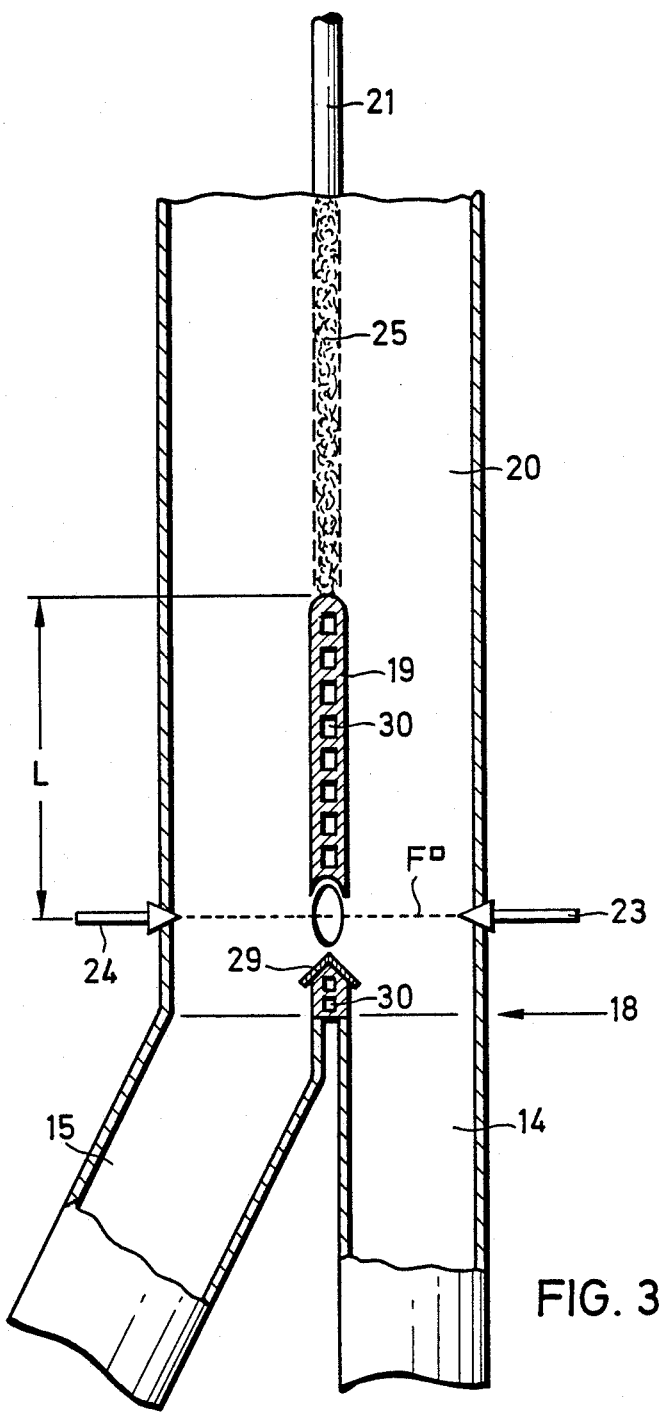
FIG. 3 is another view similar to FIG. 2 illustrating a modified form of the invention.
Figure 4:
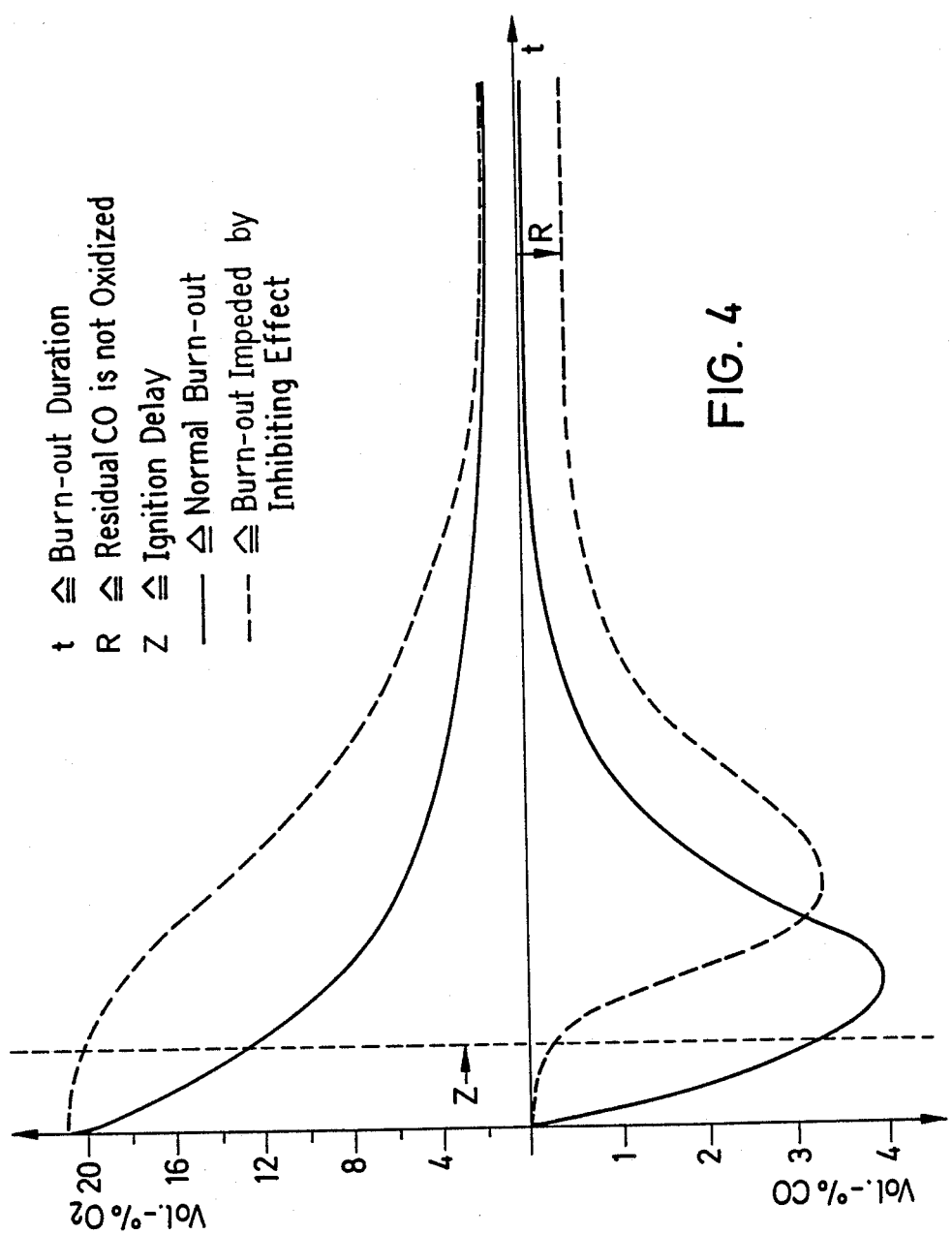

FIG. 3 illustrates a modification of the reaction stack of FIGS. 1 and 2. The feeder conduit 21 of the preheated raw meal from the preheating stage 2 delivers in alignment with the partition 19. In other words, the raw meal falls in a planar-like form in alignment with the partition 19 which forms a boundary layer 25 between the two gas streams with the boundary layer located in the reaction stack 20.

From the two conduits 14 and 15, the partition 19 extends some distance up into the stack 20. The length of the partition 19 is a function of the cross-sectional area F of the reaction stack 20.

The quantity of raw material can be divided into two gas streams with a deflector or distributor 29. It is also contemplated that the raw material can be delivered at one side or the other of the partition 19. The partition 19 can extend above the delivery location for the raw meal to stabilize flow conditions after delivery of the raw meal.

A burner 23 is located at one side of the exhaust gas stream and a burner 24 is located at the other side of the conduit in the exhaust airstream. The arrangement of the burners is based on the required calcination temperatures in the reaction stack 20. The $NO_x$ part in the exhaust gas can be influenced by the burner 23. In this embodiment of FIG. 3, the partition 19 is illustrated as composed of a refractory masonry. The masonry can be arranged with honeycomb cavities 30 through which cooling air can be circulated.

Thus, it will be seen that we have provided an improved apparatus and method used in the calcination of material such as for the production of cement which meet the objectives and advantages above set forth and which achieves efficiency and effectiveness in calcination and provides a better product as well as effecting economies in fuel.

We claim as our Invention:

1. A method for the thermal treatment of pulverulent raw material in the manufacture of cement clinker wherein the material is preheated, calcined, sintered and cooled, comprising the steps:
   passing the gas stream from the sintering stage and the airstream from the cooling stage into a common reaction zone for calcination of the raw material;
   introducing a preheated raw material into at least one of the streams;
   and bringing said streams together in a substantial flow retaining the cross-section of the streams and flowing said streams at substantially the same velocity so that a partial mixing of the two streams occurs only at the boundary layer between the streams.

2. A method for the thermal treatment of pulverulent raw material in the manufacture of cement clinker wherein the material is preheated, calcined, sintered and cooled, in accordance with the steps of claim 1:
   wherein the two streams are merged and are passed into a cyclone separator for a further calcination of the material.

3. A method for the thermal treatment of pulverulent raw material in the manufacture of cement clinker wherein the material is preheated, calcined, sintered and cooled, in accordance with the steps of claim 1:
   and flowing said streams together in a turn with the boundary layer mixing of the two streams occurring during the turn.

4. A method for the thermal treatment of pulverulent raw material in the manufacture of cement clinker wherein the material is preheated, calcined, sintered and cooled, in accordance with the steps of claim 1:
   including introducing a combustion of fuel into at least one of the streams prior to their being mixed with each other.

5. A method for the thermal treatment of pulverulent raw material in the manufacture of cement clinker wherein the material is preheated, calcined, sintered and cooled, in accordance with the steps of claim 4:
   wherein the quantity of fuel introduced is at least sufficient to consume the residual oxygen in the stream.

6. A method for the thermal treatment of pulverulent raw material in the manufacture of cement clinker wherein the material is preheated, calcined, sintered and cooled, in accordance with the steps of claim 1:
   wherein the raw material is introduced into one of said streams before the streams are mixed with one another.

7. A method for the thermal treatment of pulverulent raw material in the manufacture of cement clinker wherein the material is preheated, calcined, sintered and cooled, in accordance with the steps of claim 1:
   wherein raw material is introduced into each of the streams before they are mixed with each other.

8. An apparatus for the thermal treatment of pulverulent raw material for the manufacture of cement clinker wherein the material is preheated, calcined, sintered and cooled, comprising in combination:
   a preheating stage including a sequence of cyclones following one another;
   means for introducing raw material into said preheating stage;
   a calcination stage connected to receive the material from the preheating stage and including a reaction stack;
   a sintering kiln connected to receive the material from the calcination stage;
   a clinker cooler connected to receive the material from the sintering kiln;
   an exhaust air conduit leading from the clinker cooler and carrying heated air from the clinker cooler;
   an exhaust gas conduit leading from the kiln; and
   said conduits having portions extending substantially parallel to each other and connected to discharge to the reaction stack whereby the conduits discharge into the reaction stack with the streams flowing therethrough flowing parallel into the reaction stack and mixing at the boundary layer of the streams.

9. An apparatus for the thermal treatment of pulverulent raw material for the manufacture of cement clinker wherein the material is preheated, calcined, sintered and cooled, constructed in accordance with claim 8:
   wherein the reaction stack is rectangular in cross-section and has sides of the dimension in the ratio of between 1:1 through 1:10.

10. An apparatus for the thermal treatment of pulverulent raw material for the manufacture of cement clinker wherein the material is preheated, calcined, sintered and cooled, constructed in accordance with claim 8:
    and including a burner for the delivery of combustible fuel for providing heat to the material flowing in the reaction stack.

11. An apparatus for the thermal treatment of pulverulent raw material for the manufacture of cement clinker wherein the material is preheated, calcined, sintered and cooled, constructed in accordance with claim 8:
    including at least one burner in one of said conduits prior to its discharging into the reaction stack.

12. An apparatus for the thermal treatment of pulverulent raw material for the manufacture of cement clinker wherein the material is preheated, calcined, sintered and cooled, constructed in accordance with claim 8:
    including separate feeder means delivering material from the preheating stage into each of the conduits at a location prior to the flow from the conduits joining the reaction stack.

13. An apparatus for the thermal treatment of pulverulent raw material for the manufacture of cement clinker wherein the material is preheated, calcined, sintered and cooled, constructed in accordance with claim 8:
    including means for supplying the material from the preheating stage into the reaction stack at the location where the boundary layer between the two gas streams initiates and flows into the reaction stack.

14. An apparatus for the thermal treatment of pulverulent raw material for the manufacture of cement clinker wherein the material is preheated, calcined, sintered and cooled, constructed in accordance with claim 8:
   including a partition extending into the reaction stack intermediate said conduits and parallel thereto.

15. An apparatus for the thermal treatment of pulverulent raw material for the manufacture of cement clinker wherein the material is preheated, calcined, sintered and cooled, constructed in accordance with claim 14:
   wherein said partition is of a length L which is a function of the cross-sectional area of the reaction stack which has a cross-section F with the partition length being in the range between $L = \frac{1}{2} \cdot F$ through $L = 2 \cdot F$.

16. An apparatus for the thermal treatment of pulverulent raw material in the manufacture of cement clinker wherein the material is preheated, calcined, sintered and cooled, constructed in accordance with claim 14:
   wherein said partition comprises parallel walls spaced an adequate distance for cooling air to flow therebetween.

17. An apparatus for the thermal treatment of pulverulent raw material for the manufacture of cement clinker wherein the material is preheated, calcined, sintered and cooled, constructed in accordance with claim 8:
   including means for controllably withdrawing gas from the conduit leading from the kiln.

18. An apparatus for the thermal treatment of pulverulent raw material for the manufacture of cement clinker wherein the material is preheated, calcined, sintered and cooled, comprising in combination:
   a conduit for conducting cooling air from the clinker cooler;
   a conduit for conducting heated gases from the apparatus where the material is sintered;
   said conduits being parallel;
   a reaction stack for calcining the material connected to receive parallel flows from said conduits;
   means for delivering prior heated material to at least one of said conduits whereby the material is thermally treated in contact with the heated gases and the gases mix in boundary layer flow in the reaction chamber; and
   means for conducting the calcined material from the reaction chamber to a sintering furnace.

19. An apparatus for the thermal treatment of pulverulent raw material for the manufacture of cement clinker wherein the material is preheated, calcined, sintered and cooled, constructed in accordance with claim 18:
   wherein said conduits are of substantially the same shape and the reaction chamber provides a continuation of the walls of the conduit so that the streams from the conduits flow parallel to each other undisturbed and meet in a boundary layer between them.

20. An apparatus for the thermal treatment of pulverulent raw material for the manufacture of cement clinker wherein the material is preheated, calcined, sintered and cooled, constructed in accordance with claim 18:
   wherein material is delivered from the preheater at the location where the conduits join said reaction chamber.

* * * * *